(12) United States Patent
Alexander

(10) Patent No.: US 6,870,358 B2
(45) Date of Patent: Mar. 22, 2005

(54) METHODS AND APPARATUSES FOR PEAK DETECTION AMONG MULTIPLE SIGNALS

(75) Inventor: William C. Alexander, Spicewood, TX (US)

(73) Assignee: BAES Systems Information and Electronic Systems Integration Inc., Nashua, NH (US)

( * ) Notice: Subject to any disclaimer, the term of this patent is extended or adjusted under 35 U.S.C. 154(b) by 145 days.

(21) Appl. No.: 10/335,088

(22) Filed: Dec. 31, 2002

(65) Prior Publication Data

US 2004/0176919 A1 Sep. 9, 2004

Related U.S. Application Data

(60) Provisional application No. 60/344,933, filed on Dec. 31, 2001.

(51) Int. Cl.$^7$ ............................................... G01R 19/04
(52) U.S. Cl. .................................. 324/99 D; 324/103 P
(58) Field of Search ........................... 324/76.13, 76.15, 324/76.55, 76.58, 103 R, 103 P, 99 D, 76.28, 76.61, 76.51; 702/188–193, 124–125, 66–71

(56) References Cited

U.S. PATENT DOCUMENTS

| | | | | |
|---|---|---|---|---|
| 3,924,078 A | * | 12/1975 | Bussey | 370/241 |
| 3,973,197 A | * | 8/1976 | Meyer | 324/103 P |
| 4,081,756 A | | 3/1978 | Price et al. | 328/117 |
| 4,937,670 A | | 6/1990 | Whitledge | 358/160 |
| 4,985,902 A | * | 1/1991 | Gurcan | 375/233 |
| 5,321,559 A | * | 6/1994 | Nguyen et al. | 360/46 |
| 5,631,592 A | | 5/1997 | Schwarz et al. | 327/172 |
| 5,677,522 A | | 10/1997 | Rice et al. | 235/454 |
| 5,873,054 A | * | 2/1999 | Warburton et al. | 702/190 |
| 5,920,438 A | | 7/1999 | Christensen et al. | 360/46 |
| 5,930,231 A | | 7/1999 | Miller et al. | 370/210 |
| 5,942,920 A | | 8/1999 | Ueno | 327/58 |
| 5,966,262 A | | 10/1999 | Brickner et al. | 360/65 |
| 6,081,768 A | * | 6/2000 | Hu et al. | 702/66 |
| 6,100,829 A | * | 8/2000 | Fredrickson et al. | 341/132 |
| 6,125,154 A | | 9/2000 | Sutardja et al. | 375/345 |
| 6,151,354 A | | 11/2000 | Abbey | 375/211 |
| 6,215,335 B1 | * | 4/2001 | Rabii | 327/74 |
| 6,242,900 B1 | | 6/2001 | Fawcett et al. | 324/76.65 |
| 6,424,900 B2 | | 7/2002 | Murray et al. | 701/48 |

* cited by examiner

Primary Examiner—N. Le
Assistant Examiner—Jeff Natalini
(74) Attorney, Agent, or Firm—Fulbright & Jaworski L.L.P.

(57) ABSTRACT

Digital peak detection among multiple signals, or inputs. In one embodiment, a detection method that includes receiving multiple digitized input signals. For each digitized input signal, the method also includes noting a first data value associated with the digitized input signal at a first time. The method includes comparing the first data values to determine a largest first data value from among the first data values. For each digitized input signal, the method includes noting a second data value associated with the digitized input signal at a second time. The method includes comparing the second data values to determine a largest second data value from among the second data values. The method includes comparing the largest second data value with a threshold data value. The method includes detecting a peak when the largest second data value is greater than the threshold data value, and less than the largest first data value. In other embodiments, devices that includes a field programmable gate array (FPGA) or an application specific integrated circuit (ASIC) that is configured to perform at least the steps of this detection method. That is, the FPGA or the ASIC can be provided with logic, or programming, that can be utilized in performing the steps of this detection method.

28 Claims, 24 Drawing Sheets

| LCPK GATE ARRAY PROCESSING LAYOUT | | | | | | |
|---|---|---|---|---|---|---|
| | TIME STEPS → | | | | | |
| | n+2 | n+1 | n | n-1 | | n-2 |
| | | | | | | |
| | | IN-MEANS | | | IF DECREASING AND MAX n>MAX n-1, THEN SET | |
| | INPUT | HIGH PASSED | | | IF INCREASING AND MAX n<MAX n-1 AND MAX n> | |
| | 10 BITS | TRUNCATE TO 14 BITS | | | | |
| | | | | | | |
| INPUT(NO PULSE) = ~100 | xxx 1 | xxx.x 1 | 1 | 1 | 1 | |
| ONE BIT → | 2 | 2 | 2 | 2 | 2 | n-2 |
| OR'd OTR BITS → | | | | | | |
| | | | MAX n>THRESH? | Y OR N | | TO FIFO, IF PULSE DETECTED |
| x IS A HEX DIGIT | | | MAX n | MAX n-1 | | |
| | | | | | | |
| | | | MAX n<MAX n-1? | Y OR N | | |
| | | | MAX n>MAX n-1? | Y OR N | | |
| | | | | | | |
| | | (IN-MEAN)/2^8 | MEAN = MEAN + (IN-MEAN)/2^6 | | | |
| | | ARITHMETIC SHIFT, 18 BITS | MEAN | DECREASING/INCREASING | | |
| | | (+-) 0.xxxx 1 | xxx.xxxx 1 | MEAN(INITIAL) = 200 | | |
| | | 2 | 2 | | | |
| 32 BIT COUNTER | | 2^6 IS A 2.56 MICRO-SECOND TIME CONSTANT ON THE LOW PASS FILTER TO GET THE | | | | |
| TIME STAMP = TIME STAMP + 1 | | USE 2^6 FOR BREADBOARD SINCE TAKES LESS TIME TO SIMULATE | | | | |

FIG.2

| | 6 | 7 | 8 | 9 | 10 | 11 | 12 |
|---|---|---|---|---|---|---|---|
| | n | n-1 | n-2 | | | | |
| | AND MAX n>MAX n-1, THEN SET TO INCREASING | | | | | | |
| | AND MAX n<MAX n-1 AND MAX n> THRESH, THEN SET TO DECREASING AND STORE CURRENT (n-2) TO FIFO | | | | | | |
| | | | | TOTAL FLIP-FLOPS FOR 7 CHANNELS | | | |
| | 114 | 116 | 99 | 1079 | | | |
| | 1 | 1 | 1 | | | | |
| | 2 | 2 | 2 | | | | |
| | | | | | | | |
| | | | | | | | |
| | Y OR N | | TO FIFO, IF PULSE DETECTED | | | | |
| | MAX n-1 | | | | | | |
| | Y OR N | | | | | | |
| | Y OR N | | | | | | |

FIG. 3-2

CONT'D FROM FIG. 3-4

CONT'D FROM FIG. 3-1

CONT'D FROM FIG.3-1 { ... } CONT'D ON FIG.3-4

| | | | | MEAN = MEAN + |
|---|---|---|---|---|
| | | | (IN-MEAN)/2^14 | MEAN |
| | | | ARITHMETIC SHIFT, 16 BITS | 24 BITS |
| | | | (+-)0.xxxx | xxx.xxxx |
| | | | 1  2 | 1  2 |
| | | | | |
| | | | | |
| | | 2^14 IS A 163 MICRO-SECOND TIME CONSTANT ON THE LOW | |

32 BIT COUNTER
TIME STAMP = TIME STAMP + 1

FIG.3-3

| 1 | 2 | 3 | 4 | 5 | 6 | 7 | 8 | 9 | 10 | 11 | 12 |
|---|---|---|---|---|---|---|---|---|---|---|---|
| LCPK gate array processing layout | | | | | | | | | | | |
| | Time steps - | | | | | | | | | | |
| | n+4 | n+3 | n+2 | n+1 | n | n-1 | n-2 | | | | |
| | | In - Means | | | If decreasing AND Max n > Max n-1, then set to increasing | | | | | | |
| | Input | High Passed | | | If increasing AND Max n < Max n-1 AND Max n > Thresh, then set to decreasing and store current (n-2) to FIFO | | | | | | |
| | 10 bits | truncate to 14 bits | | | | | | total flip-flops for 7 channels | | | |
| Number of flip-flops used in column -> | 71 | 99 | 253 | 295 | 114 | 116 | 99 | 1079 | | | |
| Input(no pulse) = ~100 | xxx | 1 xxx.x | | | | | | | | | |
| | 2 | 2 | 2 | 2 | 2 | 2 | 2 | | | | |
| | 3 | 3 | 3 | 3 | 3 | 3 | 3 | | | | |
| | 4 | 4 | 4 | 4 | 4 | 4 | 4 | | | | |
| | 5 | 5 | 5 | 5 | 5 | 5 | 5 | | | | |
| | 6 | 6 | 6 | 6 | 6 | 6 | 6 | | | | |
| | 7 | 7 | 7 | 7 | 7 | 7 | 7 | | | | |
| one bit -> | OR'd OTR bits -> | | | | | | | | | | |
| | | Find Maximum channel | | | Max n > Thresh? | Y or N | To FIFO, if pulse detected | | | | |
| | | | Max 1&2 | Max 1&2&3&4 | Max n | Max n-1 | | | | | |
| x is a hex digit | | | Max 3&4 | | | | | | | | |
| | | | | | Max n < Max n-1? | Y or N | | | | | |
| | | | Max 5&6 | Max 5&6&7 | Max n > | Y or N | | | | | |

FIG. 4

CONT'D FROM FIG.4

| 1 | 2 | 3 | 4 | 5 | 6 | 7 | 8 | 9 | 10 | 11 | 12 |
|---|---|---|---|---|---|---|---|---|----|----|----|
|   |   |   |   |   | Max n-1? |   |   |   |    |    |    |
|   |   |   |   | Mean = Mean + (in-mean)/2^14 |   |   |   |    |    |    |
|   |   |   | (in - mean)/2^14 arithmetic shift, 16 bits | Mean 24 bits |   | decreaing/increasing |   |   |    |    |    |
|   |   |   | (+-) 0.xxxx | 1 xxx.xxxx | 1 |   |   |   |    |    |    |
|   |   |   | 2 | 2 | 2 |   |   |   |    |    |    |
|   |   |   | 3 | 3 | 3 Mean(initial) = 200 |   |   |   |    |    |    |
|   |   |   | 4 | 4 | 4 |   |   |   |    |    |    |
|   |   |   | 5 | 5 | 5 |   |   |   |    |    |    |
|   |   |   | 6 | 6 | 6 |   |   |   |    |    |    |
|   |   |   | 7 | 7 | 7 |   |   |   |    |    |    |
|   |   |   |   |   |   |   |   |   |    |    |    |
| 32 bit counter |   | 2^14 is a 163 micro-second time constant on the low pass filter to get the mean, high pass by subtracting mean from input |   |   |   |   |   |   |    |    |    |
| Time stamp = Time stamp + 1 |   |   |   |   |   |   |   |   |    |    |    |

| 1 | 2 | 3 | 4 | 5 | 6 |
|---|---|---|---|---|---|
| LCPK GATE ARRAY PROCESSING LAYOUT | | | | | |
| | TIME STEPS → | | | | |
| | n+6 | n+5 | n+4 | n+3 | n+2 |
| | | IN-MEANS | | | IF DECREASING |
| | | HIGH PASSED | | | IF INCREASING |
| | INPUT | TRUNCATE TO 14 BITS | | | |
| | 10 BITS | | | | |
| NUMBER OF FLIP-FLOPS USED IN COLUMN → | 191 | 267 | 393 | 351 | 309 |
| INPUT(NO PULSE) = ~100 | 1 | 1 | 1 | 1 | 1 |
| xxx | 2 | 2 | 2 | 2 | 2 |
| | 3 | 3 | 3 | 3 | 3 |
| | 4 | 4 | 4 | 4 | 4 |
| | 5 | 5 | 5 | 5 | 5 |
| | 6 | 6 | 6 | 6 | 6 |
| | 7 | 7 | 7 | 7 | 7 |
| | 8 | 8 | 8 | 8 | 8 |
| | 9 | 9 | 9 | 9 | 9 |
| | 10 | 10 | 10 | 10 | 10 |
| | 11 | 11 | 11 | 11 | 11 |
| | 12 | 12 | 12 | 12 | 12 |
| | 13 | 13 | 13 | 13 | 13 |
| | 14 | 14 | 14 | 14 | 14 |
| | 15 | 15 | 15 | 15 | 15 |

(Input row xxx.x values for n+5, n+4, n+3, n+2 columns)

| 7 | 8 | 9 | 10 | 11 | 12 | 13 |
|---|---|---|---|---|---|---|
| n+1 | n | n-1 | n-2 | | | |
| AND MAX n>MAX n-1, THEN SET TO INCREASING | | | | | | |
| AND MAX n<MAX n-1 AND MAX n> THRESH, THEN SET TO DECREASING AND STORE CURRENT (n-2) TO FIFO | | | | | | |
| | | | | TOTAL FLIP-FLOPS FOR 19 CHANNELS | | |
| 295 | 585 | 740 | 268 | 3431 | | |
| xxx.x | 1 | 1 | 1 | | | |
| 1 | xxx.x | 2 | 2 | | | |
| 2 | 2 | 3 | 3 | | | |
| 3 | 3 | 4 | 4 | | | |
| 4 | 4 | 5 | 5 | | | |
| 5 | 5 | 6 | 6 | | | |
| 6 | 6 | 7 | 7 | | | |
| 7 | 7 | 8 | 8 | | | |
| 8 | 8 | 9 | 9 | | | |
| 9 | 9 | 10 | 10 | | | |
| 10 | 10 | 11 | 11 | | | |
| 11 | 11 | 12 | 12 | | | |
| 12 | 12 | 13 | 13 | | | |
| 13 | 13 | 14 | 14 | | | |
| 14 | 14 | 15 | 15 | | | |
| 15 | 15 | | | | | |

CONT'D FROM FIG.5-1

| ONE BIT -> | | | | | | | | | CONT'D FROM FIG.5-1 |
|---|---|---|---|---|---|---|---|---|---|
| | | 16 | 16 | 16 | 16 | | | | |
| | | 17 | 17 | 17 | 17 | | | | |
| | | 18 | 18 | 18 | 18 | | | | |
| | | 19 | 19 | 19 | 19 | | | | |
| x IS A HEX DIGIT | OR'd OTR BITS -> | | FIND MAXIMUM CHANNEL | | | | | | |
| | | | MAX 1&2 | MAX 1-4 | MAX 1-8 | | | | |
| | | | MAX 3&4 | | | | | | |
| | | | MAX 5&6 | MAX 5-8 | | | | | |
| | | | MAX 7&8 | | | | | | CONT'D ON FIG.5-4 |
| | | | MAX 9&10 | MAX 9-12 | MAX 9-16 | | | | |
| | | | MAX 11&12 | | | | | | |
| | | | MAX 13&14 | MAX 13-16 | | | | | |
| | | | MAX 15&16 | | | | | | |
| | | | MAX 17&18 | MAX 17-19 | MAX 17-19 | | | | |

CONT'D FROM FIG.5-2 — CONT'D ON FIG.5-6

| | | | | | | | |
|---|---|---|---|---|---|---|---|
| 16 | | | 16 | 16 | | | |
| 17 | | | 17 | 17 | | | |
| 18 | | | 18 | 18 | | | |
| 19 | | | 19 | 19 | | | |
| MAX 1–16 | MAX n>THRESH? | MAX n | Y OR N | Y OR N | TO FIFO, IF PULSE DETECTED | | |
| | MAX n<MAX n–1? | MAX n–1 | Y OR N | | | | |
| | MAX n>MAX n–1? | | Y OR N | | | | |
| | (IN–MEAN)/2^14 | MEAN = MEAN + (IN–MEAN)/2^14 | | | | | |
| | ARITHMETIC SHIFT, 16 BITS | MEAN | | DECREASING/INCREASING | | | |
| | | 24 BITS | | | | | |
| | (+–)0.xxxx | xxx.xxxx | 1 | 1 | | | |
| | | | 2 | 2 | | | |
| | | | 3 | 3 | MEAN(INITIAL) = 200 | | |
| | | | 4 | 4 | | | |
| | | | 5 | 5 | | | |
| | | | 6 | 6 | | | |
| MAX 17–19 | | | 7 | 7 | | | |
| | | | 8 | 8 | | | |

CONT'D FROM FIG.5-3

FIG.5-6

| | | | | | | | | | | | |
|---|---|---|---|---|---|---|---|---|---|---|---|
| 9 | | | | | | | | | | | 9 |
| 10 | | | | | | | | | | | 10 |
| 11 | | | | | | | | | | | 11 |
| 12 | | | | | | | | | | | 12 |
| 13 | | | | | | | | | | | 13 |
| 14 | | | | | | | | | | | 14 |
| 15 | | | | | | | | | | | 15 |
| 16 | | | | | | | | | | | 16 |
| 17 | | | | | | | | | | | 17 |
| 18 | | | | | | | | | | | 18 |
| 19 | | | | | | | | | | | 19 |
| TO GET THE MEAN, HIGH PASS BY SUBTRACTING MEAN FROM INPUT | | | | | | | | | | | |

CONT'D FROM FIG.5-4

CONT'D FROM FIG.5-5

|  | 1 | 2 | 3 | 4 | 5 | 6 |
|---|---|---|---|---|---|---|
|  | Inputs |  | (In - Mean) (n+1) |  | (In - Mean) (n) |  |
|  | 1 | 2 | 1 | 2 | 1 | 2 |
|  | 38.77201628 | 40.20384143 | 0 | 0 | 0 | 0 |
| 0 | 39.95391086 | 40.82670895 | -11.22798372 | -9.796158568 | 0 | 0 |
| 1 | 41.33061617 | 40.25745701 | -10.04608914 | -9.17329105 | -11.22798372 | -9.796158568 |
| 2 | 40.28015601 | 40.80882139 | -8.66938383 | -9.742542989 | -10.04608914 | -9.17329105 |
| 3 | 39.85622274 | 41.1700449 | -9.270724644 | -8.79933227 | -8.66938383 | -9.742542989 |
| 4 | 41.05124985 | 38.05276509 | -9.292814347 | -8.07117712 | -9.270724644 | -8.79933227 |
| 5 | 41.51687277 | 41.81536214 | -7.751011886 | -10.79875521 | -9.292814347 | -8.07117712 |
| 6 | 39.41563691 | 41.97562064 | -6.914559978 | -6.684184866 | -7.751011886 | -10.79875521 |
| 7 | 39.798099 | 39.14010313 | -8.644083266 | -6.201079278 | -6.914559978 | -6.684184866 |
| 8 | 41.50395019 | 39.90109547 | -7.951580694 | -8.604646587 | -8.644083266 | -6.201079278 |
| 9 | 38.99511819 | 40.981789 | -5.96914711 | -7.576286844 | -7.951580694 | -8.604646587 |
| 10 | 40.29529951 | 39.52015579 | -8.132215773 | -6.247550142 | -5.96914711 | -7.576286844 |
| 11 | 40.53789582 | 39.03021002 | -6.51397123 | -7.364997495 | -8.132215773 | -6.247550142 |
| 12 | 39.44956572 | 39.56202059 | -6.032609035 | -7.551891791 | -6.51397123 | -7.364997495 |
| 13 | 40.65601433 | 41.23488552 | -6.795650508 | -6.770179209 | -6.032609035 | -7.551891791 |
| 14 | 39.49825777 | 39.99049516 | -5.328643047 | -4.802714382 | -6.795650508 | -6.770179209 |
| 15 | 41.061312 | 39.25997516 | -6.245095242 | -5.745029073 | -5.328643047 | -4.802714382 |
| 16 | 41.39765957 | 40.66719808 | -4.41021499 | -6.204741908 | -6.245095242 | -5.745029073 |
| 17 | 40.9286042 | 41.42796897 | -3.860721698 | -4.605410407 | -4.41021499 | -6.204741908 |
| 18 | 38.26663096 | 41.21346312 | -4.079973257 | -3.614838351 | -3.860721698 | -4.605410407 |
| 19 | 38.68896937 | 38.71885181 | -6.565537902 | -3.581154527 | -4.079973257 | -3.614838351 |
| 20 | 39.21167636 | 40.64946201 | -5.988770627 | -5.891549419 | -6.565537902 | -3.581154527 |
| 21 | 39.68840283 | 41.85712688 | -5.302864703 | -3.816345692 | -5.988770627 | -5.891549419 |
| 22 | 39.80297442 | 40.94317866 | -4.563516722 | -2.465434637 | -5.302864703 | -3.816345692 |
| 23 | 40.71317563 | 39.71243945 | -4.209394299 | -3.143720876 | -4.563516722 | -2.465434637 |
| 24 | 38.16463366 | 41.55435489 | -3.087078504 | -4.22180626 | -4.209394299 | -3.143720876 |
| 25 | 39.23110773 | 41.72471091 | -5.45307981 | -2.281273443 | -3.087078504 | -4.22180626 |
| 26 | 41.10058847 | 38.59446648 | -4.218229961 | -1.985168587 | -5.45307981 | -2.281273443 |
| 27 | 39.6099938 | 40.94275172 | -2.22526608 | -4.946540764 | -4.218229961 | -1.985168587 |
| 28 | 39.57357677 | 38.54584342 | -3.497737556 | -2.50700458 | -2.22526608 | -4.946540764 |
| 29 | 40.44330522 | 39.97796538 | -3.365425394 | -4.824506137 | -3.497737556 | -2.50700458 |
| 30 | 38.96661569 | 41.53325744 | -2.406686303 | -3.19452255 | -3.365425394 | -4.824506137 |
| 31 | 40.46560309 | 41.57658286 | -3.743466331 | -1.538950308 | -2.406686303 | -3.19452255 |
| 32 | 39.16797997 | 39.37504558 | -2.109861911 | -1.302644639 | -3.743466331 | -1.538950308 |
| 33 | 38.45214639 | 41.08192718 | -3.311217581 | -3.376401017 | -2.109861911 | -1.302644639 |
| 34 | 41.81694701 | 38.9040802 | -3.877312502 | -1.607961407 | -3.311217581 | -3.376401017 |
| 35 | 38.8308786 | 39.97698662 | -0.428117406 | -3.733702602 | -3.877312502 | -1.607961407 |
| 36 | 41.69138903 | 40.51897425 | -3.281737112 | -2.525740144 | -0.428117406 | -3.733702602 |
| 37 | 41.08824699 | 41.91469738 | -0.266134185 | -1.919434058 | -3.281737112 | -2.525740144 |
| 38 | 39.06008241 | 41.83954941 | -0.852151533 | -0.374362824 | -0.266134185 | -1.919434058 |
| 39 | 38.51960027 | 40.78094637 | -2.749046622 | -0.348481183 | -0.852151533 | -0.374362824 |
| 40 | 40.387734 | 40.13273011 | -3.278883399 | -1.330306863 | -2.749046622 | -0.348481183 |
| 41 | 40.99086523 | 38.43520472 | -1.376663605 | -1.963548608 | -3.278883399 | -1.330306863 |
| 42 | 39.60020262 | 41.78624935 | -0.663570512 | -3.647134752 | -1.376663605 | -1.963548608 |
| 43 | 38.34405264 | 40.42088369 | -1.92307779 | -0.242877845 | -0.663570512 | -3.647134752 |
| 44 | 39.04404598 | 38.00287127 | -3.124161226 | -1.529701561 | -1.92307779 | -0.242877845 |
| 45 | 40.4872373 | 38.2995257 | -2.397625061 | -3.801828594 | -3.124161226 | -1.529701561 |
| 46 | 46.5546516 | 44.30184859 | -0.877510626 | -3.495459047 | -2.397625061 | -3.801828594 |

FIG. 6-1

|   | 7 | 8 | 9 | 10 | 11 | 12 | 13 |
|---|---|---|---|---|---|---|---|
|   | (In - Mean) (n-1) | | (In - Mean) (n-2) | | Means | | (In - Mean)/25 |
|   | 1 | 2 | 1 | 2 | 1 | 2 | 1 |
|   |   | 0 | 0 | 0 |   | 50 | 50 | 0 |
| 0 | 0 | 0 | 0 | 0 | 50 | 50 | 0 |
| 1 | 0 | 0 | 0 | 0 | 50 | 50 | -0.449119349 |
| 2 | -11.22798372 | -9.7961586 | 0 | 0 | 49.55088 | 49.60815 | -0.401843566 |
| 3 | -10.04608914 | -9.173291 | -11.22798372 | -9.796159 | 49.14904 | 49.24122 | -0.346775353 |
| 4 | -8.66938383 | -9.742543 | -10.04608914 | -9.173291 | 48.80226 | 48.85152 | -0.370828986 |
| 5 | -9.270724644 | -8.7993323 | -8.66938383 | -9.742543 | 48.43143 | 48.49955 | -0.371712574 |
| 6 | -9.292814347 | -8.0711771 | -9.270724644 | -8.799332 | 48.05972 | 48.1767 | -0.310040475 |
| 7 | -7.751011886 | -10.798755 | -9.292814347 | -8.071177 | 47.74968 | 47.74475 | -0.276582399 |
| 8 | -6.914559978 | -6.6841849 | -7.751011886 | -10.79876 | 47.4731 | 47.47738 | -0.345763331 |
| 9 | -8.644083266 | -6.2010793 | -6.914559978 | -6.684185 | 47.12733 | 47.22934 | -0.318063228 |
| 10 | -7.951580694 | -8.6046466 | -8.644083266 | -6.201079 | 46.80927 | 46.88515 | -0.238765884 |
| 11 | -5.96914711 | -7.5762868 | -7.951580694 | -8.604647 | 46.5705 | 46.5821 | -0.325288631 |
| 12 | -8.132215773 | -6.2475501 | -5.96914711 | -7.576287 | 46.24522 | 46.3322 | -0.260558849 |
| 13 | -6.51397123 | -7.3649975 | -8.132215773 | -6.24755 | 45.98466 | 46.0376 | -0.241304361 |
| 14 | -6.032609035 | -7.5518918 | -6.51397123 | -7.364997 | 45.74335 | 45.73552 | -0.27182602 |
| 15 | -6.795650508 | -6.7701792 | -6.032609035 | -7.551892 | 45.47153 | 45.46472 | -0.213145722 |
| 16 | -5.328643047 | -4.8027144 | -6.795650508 | -6.770179 | 45.25838 | 45.27261 | -0.24980381 |
| 17 | -6.245095242 | -5.7450291 | -5.328643047 | -4.802714 | 45.00858 | 45.04281 | -0.1764086 |
| 18 | -4.41021499 | -6.2047419 | -6.245095242 | -5.745029 | 44.83217 | 44.79462 | -0.154428868 |
| 19 | -3.860721698 | -4.6054104 | -4.41021499 | -6.204742 | 44.67774 | 44.6104 | -0.16319893 |
| 20 | -4.079973257 | -3.6148384 | -3.860721698 | -4.60541 | 44.51454 | 44.46581 | -0.262621516 |
| 21 | -6.565537902 | -3.5811545 | -4.079973257 | -3.614838 | 44.25192 | 44.32256 | -0.239550825 |
| 22 | -5.988770627 | -5.8915494 | -6.565537902 | -3.581155 | 44.01237 | 44.0869 | -0.212114588 |
| 23 | -5.302864703 | -3.8163457 | -5.988770627 | -5.891549 | 43.80025 | 43.93425 | -0.182540669 |
| 24 | -4.563516722 | -2.4654346 | -5.302864703 | -3.816346 | 43.61771 | 43.83563 | -0.168375772 |
| 25 | -4.209394299 | -3.1437209 | -4.563516722 | -2.465435 | 43.44934 | 43.70988 | -0.12348314 |
| 26 | -3.087078504 | -4.2218063 | -4.209394299 | -3.143721 | 43.32585 | 43.54101 | -0.218123192 |
| 27 | -5.45307981 | -2.2812734 | -3.087078504 | -4.221806 | 43.10773 | 43.44976 | -0.168729198 |
| 28 | -4.218229961 | -1.9851686 | -5.45307981 | -2.281273 | 42.939 | 43.37035 | -0.089010643 |
| 29 | -2.22526608 | -4.9465408 | -4.218229961 | -1.985169 | 42.84999 | 43.17249 | -0.139909502 |
| 30 | -3.497737556 | -2.5070046 | -2.22526608 | -4.946541 | 42.71008 | 43.07221 | -0.134617016 |
| 31 | -3.365425394 | -4.8245061 | -3.497737556 | -2.507005 | 42.57547 | 42.87923 | -0.096267452 |
| 32 | -2.406686303 | -3.1945226 | -3.365425394 | -4.824506 | 42.4792 | 42.75145 | -0.149738653 |
| 33 | -3.743466331 | -1.5389503 | -2.406686303 | -3.194523 | 42.32946 | 42.68989 | -0.084394476 |
| 34 | -2.109861911 | -1.3026446 | -3.743466331 | -1.53895 | 42.24506 | 42.63778 | -0.132448703 |
| 35 | -3.311217581 | -3.376401 | -2.109861911 | -1.302645 | 42.11262 | 42.50273 | -0.1550925 |
| 36 | -3.877312502 | -1.6079614 | -3.311217581 | -3.376401 | 41.95752 | 42.43841 | -0.017124696 |
| 37 | -0.428117406 | -3.7337026 | -3.877312502 | -1.607961 | 41.9404 | 42.28906 | -0.131269484 |
| 38 | -3.281737112 | -2.5257401 | -0.428117406 | -3.733703 | 41.80913 | 42.18803 | -0.010645367 |
| 39 | -0.266134185 | -1.9194341 | -3.281737112 | -2.52574 | 41.79848 | 42.11125 | -0.034086061 |
| 40 | -0.852151533 | -0.3743628 | -0.266134185 | -1.919434 | 41.7644 | 42.09628 | -0.109961865 |
| 41 | -2.749046622 | -0.3484812 | -0.852151533 | -0.374363 | 41.65444 | 42.08234 | -0.131155336 |
| 42 | -3.278883399 | -1.3303069 | -2.749046622 | -0.348481 | 41.52328 | 42.02913 | -0.055066544 |
| 43 | -1.376663605 | -1.9635486 | -3.278883399 | -1.330307 | 41.46821 | 41.95059 | -0.02654282 |
| 44 | -0.663570512 | -3.6471348 | -1.376663605 | -1.963549 | 41.44167 | 41.8047 | -0.076923112 |
| 45 | -1.92307779 | -0.2428778 | -0.663570512 | -3.647135 | 41.36475 | 41.79498 | -0.124966449 |
| 46 | -3.124161226 | -1.5297016 | -1.92307779 | -0.242878 | 41.23978 | 41.7338 | -0.095905002 |

FIG. 6-2

| | 14 | 15 | 16 | 17 | 18 | 19 | 20 |
|---|---|---|---|---|---|---|---|
| | | Max n | Max n-1 | Max n > Thresh? | Max n > Max n-1 ? | Max n < Max n-1? | Increasing |
| | 2 | | | | | | |
| | 0 | | | | | | |
| 0 | 0 | 0 | 0 | 0 | 0 | 0 | 0 |
| 1 | -0.391846 | 0 | 0 | 0 | 0 | 0 | 0 |
| 2 | -0.366932 | -9.796158568 | 0 | 0 | 0 | 1 | 0 |
| 3 | -0.389702 | -9.17329105 | -9.796159 | 0 | 1 | 0 | 0 |
| 4 | -0.351973 | -8.66938383 | -9.173291 | 0 | 1 | 0 | 1 |
| 5 | -0.322847 | -8.79933227 | -8.669384 | 0 | 0 | 1 | 1 |
| 6 | -0.43195 | -8.07117712 | -8.799332 | 0 | 1 | 0 | 1 |
| 7 | -0.267367 | -7.751011886 | -8.071177 | 0 | 1 | 0 | 1 |
| 8 | -0.248043 | -6.684184866 | -7.751012 | 0 | 1 | 0 | 1 |
| 9 | -0.344186 | -6.201079278 | -6.684185 | 0 | 1 | 0 | 1 |
| 10 | -0.303051 | -7.951580694 | -6.201079 | 0 | 0 | 1 | 1 |
| 11 | -0.249902 | -5.96914711 | -7.951581 | 0 | 1 | 0 | 1 |
| 12 | -0.2946 | -6.247550142 | -5.969147 | 0 | 0 | 1 | 1 |
| 13 | -0.302076 | -6.51397123 | -6.24755 | 0 | 0 | 1 | 1 |
| 14 | -0.270807 | -6.032609035 | -6.513971 | 0 | 1 | 0 | 1 |
| 15 | -0.192109 | -6.770179209 | -6.032609 | 0 | 0 | 1 | 1 |
| 16 | -0.229801 | -4.802714382 | -6.770179 | 0 | 1 | 0 | 1 |
| 17 | -0.24819 | -5.745029073 | -4.802714 | 0 | 0 | 1 | 1 |
| 18 | -0.184216 | -4.41021499 | -5.745029 | 0 | 1 | 0 | 1 |
| 19 | -0.144594 | -3.860721698 | -4.410215 | 0 | 1 | 0 | 1 |
| 20 | -0.143246 | -3.614838351 | -3.860722 | 0 | 1 | 0 | 1 |
| 21 | -0.235662 | -3.581154527 | -3.614838 | 0 | 1 | 0 | 1 |
| 22 | -0.152654 | -5.891549419 | -3.581155 | 0 | 0 | 1 | 1 |
| 23 | -0.098617 | -3.816345692 | -5.891549 | 0 | 1 | 0 | 1 |
| 24 | -0.125749 | -2.465434637 | -3.816346 | 0 | 1 | 0 | 1 |
| 25 | -0.168872 | -3.143720876 | -2.465435 | 0 | 0 | 1 | 1 |
| 26 | -0.091251 | -3.087078504 | -3.143721 | 0 | 1 | 0 | 1 |
| 27 | -0.079407 | -2.281273443 | -3.087079 | 0 | 1 | 0 | 1 |
| 28 | -0.197862 | -1.985168587 | -2.281273 | 0 | 1 | 0 | 1 |
| 29 | -0.10028 | -2.22526608 | -1.985169 | 0 | 0 | 1 | 1 |
| 30 | -0.19298 | -2.50700458 | -2.225266 | 0 | 0 | 1 | 1 |
| 31 | -0.127781 | -3.365425394 | -2.507005 | 0 | 0 | 1 | 1 |
| 32 | -0.061558 | -2.406686303 | -3.365425 | 0 | 1 | 0 | 1 |
| 33 | -0.052106 | -1.538950308 | -2.406686 | 0 | 1 | 0 | 1 |
| 34 | -0.135056 | -1.302644639 | -1.53895 | 0 | 1 | 0 | 1 |
| 35 | -0.064318 | -3.311217581 | -1.302645 | 0 | 0 | 1 | 1 |
| 36 | -0.149348 | -1.607961407 | -3.311218 | 0 | 1 | 0 | 1 |
| 37 | -0.10103 | -0.428117406 | -1.607961 | 0 | 1 | 0 | 1 |
| 38 | -0.076777 | -2.525740144 | -0.428117 | 0 | 0 | 1 | 1 |
| 39 | -0.014975 | -0.266134185 | -2.52574 | 0 | 1 | 0 | 1 |
| 40 | -0.013939 | -0.374362824 | -0.266134 | 0 | 0 | 1 | 1 |
| 41 | -0.053212 | -0.348481183 | -0.374363 | 0 | 1 | 0 | 1 |
| 42 | -0.078542 | -1.330306863 | -0.348481 | 0 | 0 | 1 | 1 |
| 43 | -0.145885 | -1.376663605 | -1.330307 | 0 | 0 | 1 | 1 |
| 44 | -0.009715 | -0.663570512 | -1.376664 | 0 | 1 | 0 | 1 |
| 45 | -0.061188 | -0.242877845 | -0.663571 | 0 | 1 | 0 | 1 |
| 46 | -0.152073 | -1.529701561 | -0.242878 | 0 | 0 | 1 | 1 |

FIG. 6-3

|   | 1 | 2 | 3 | 4 | 5 | 6 |
|---|---|---|---|---|---|---|
|   | Inputs | | (In - Mean) (n+1) | | (In - Mean) (n) | |
|   | 1 | 2 | 1 | 2 | 1 | 2 |
| 47 | 51.10467069 | 48.6715667 | 5.31487012 | 2.568051902 | -0.877510626 | -3.495459047 |
| 48 | 54.91734644 | 50.30035905 | 9.960794207 | 7.089843154 | 5.31487012 | 2.568051902 |
| 49 | 59.78241239 | 57.00208279 | 13.80857038 | 8.858453871 | 9.960794207 | 7.089843154 |
| 50 | 54.64391988 | 53.26180193 | 18.46104153 | 15.45745553 | 13.80857038 | 8.858453871 |
| 51 | 50.60918426 | 46.81441976 | 12.92411725 | 11.43358095 | 18.46104153 | 15.45745553 |
| 52 | 43.78431008 | 42.67202618 | 8.337038818 | 4.631860624 | 12.92411725 | 11.43358095 |
| 53 | 45.90682609 | 44.16747418 | 0.773722982 | -0.12883118 | 8.337038818 | 4.631860624 |
| 54 | 46.8161146 | 46.30030772 | 2.379274294 | 0.909273578 | 0.773722982 | -0.12883118 |
| 55 | 41.13445211 | 40.61666726 | 2.955081258 | 2.856832702 | 2.379274294 | 0.909273578 |
| 56 | 41.38394984 | 39.77319404 | -2.75753015 | -2.821654517 | 2.955081258 | 2.856832702 |
| 57 | 38.07381406 | 38.47522946 | -2.603203399 | -3.701498681 | -2.75753015 | -2.821654517 |
| 58 | 40.4400397 | 40.01950868 | -6.031542427 | -5.113736569 | -2.603203399 | -3.701498681 |
| 59 | 39.56900257 | 41.6779069 | -3.555015578 | -3.456591168 | -6.031542427 | -5.113736569 |
| 60 | 40.68229636 | 40.08307066 | -4.321924579 | -1.650132996 | -3.555015578 | -3.456591168 |
| 61 | 41.82947131 | 41.40973263 | -2.967369083 | -3.040419772 | -4.321924579 | -1.650132996 |
| 62 | 39.91941395 | 39.31810143 | -1.677993512 | -1.575494159 | -2.967369083 | -3.040419772 |
| 63 | 41.91899733 | 40.89777759 | -3.41517389 | -3.601120043 | -1.677993512 | -1.575494159 |
| 64 | 41.4251148 | 39.92756133 | -1.296895747 | -1.899827091 | -3.41517389 | -3.601120043 |
| 65 | 38.79839958 | 39.48823471 | -1.723658536 | -2.807023584 | -1.296895747 | -1.899827091 |
| 66 | 39.06879574 | 38.45292979 | -4.213766805 | -3.1023054 | -1.723658536 | -2.807023584 |
| 67 | 38.69276119 | 41.06973297 | -3.891494816 | -4.061617235 | -4.213766805 | -3.1023054 |
| 68 | 41.09685617 | 39.36709618 | -4.198583024 | -1.332533118 | -3.891494816 | -4.061617235 |
| 69 | 39.81208856 | 40.65359605 | -1.625937371 | -2.911077691 | -4.198583024 | -1.332533118 |
| 70 | 39.89775056 | 38.28887613 | -2.755045182 | -1.462113131 | -1.625937371 | -2.911077691 |
| 71 | 38.56689172 | 41.07868054 | -2.501439861 | -3.773531727 | -2.755045182 | -1.462113131 |

FIG. 6-4

|   | 7 | 8 | 9 | 10 | 11 | 12 | 13 |
|---|---|---|---|---|---|---|---|
|   | (In - Mean) (n-1) | | (In - Mean) (n-2) | | Means | | (In - Mean)/25 |
|   | 1 | 2 | 1 | 2 | 1 | 2 | 1 |
| 47 | -2.397625061 | -3.8018286 | -3.124161226 | -1.529702 | 41.14388 | 41.58172 | -0.035100425 |
| 48 | -0.877510626 | -3.495459 | -2.397625061 | -3.801829 | 41.10878 | 41.44191 | 0.212594805 |
| 49 | 5.31487012 | 2.5680519 | -0.877510626 | -3.495459 | 41.32137 | 41.54463 | 0.398431768 |
| 50 | 9.960794207 | 7.08984315 | 5.31487012 | 2.568052 | 41.7198 | 41.82822 | 0.552342815 |
| 51 | 13.80857038 | 8.85845387 | 9.960794207 | 7.089843 | 42.27215 | 42.18256 | 0.738441661 |
| 52 | 18.46104153 | 15.4574555 | 13.80857038 | 8.858454 | 43.01059 | 42.80086 | 0.51696469 |
| 53 | 12.92411725 | 11.4335809 | 18.46104153 | 15.45746 | 43.52755 | 43.2582 | 0.333481553 |
| 54 | 8.337038818 | 4.63186062 | 12.92411725 | 11.43358 | 43.86103 | 43.44348 | 0.030948919 |
| 55 | 0.773722982 | -0.1288312 | 8.337038818 | 4.631861 | 43.89198 | 43.43832 | 0.095170972 |
| 56 | 2.379274294 | 0.90927358 | 0.773722982 | -0.128831 | 43.98715 | 43.47469 | 0.11820325 |
| 57 | 2.955081258 | 2.8568327 | 2.379274294 | 0.909274 | 44.10536 | 43.58897 | -0.110301206 |
| 58 | -2.75753015 | -2.8216545 | 2.955081258 | 2.856833 | 43.99506 | 43.4761 | -0.104128136 |
| 59 | -2.603203399 | -3.7014987 | -2.75753015 | -2.821655 | 43.89093 | 43.32804 | -0.241261697 |
| 60 | -6.031542427 | -5.1137366 | -2.603203399 | -3.701499 | 43.64967 | 43.12349 | -0.142200623 |
| 61 | -3.555015578 | -3.4565912 | -6.031542427 | -5.113737 | 43.50746 | 42.98523 | -0.172876983 |
| 62 | -4.321924579 | -1.650133 | -3.555015578 | -3.456591 | 43.33459 | 42.91922 | -0.118694763 |
| 63 | -2.967369083 | -3.0404198 | -4.321924579 | -1.650133 | 43.21589 | 42.7976 | -0.06711974 |
| 64 | -1.677993512 | -1.5754942 | -2.967369083 | -3.04042 | 43.14877 | 42.73458 | -0.136606956 |
| 65 | -3.41517389 | -3.60112 | -1.677993512 | -1.575494 | 43.01217 | 42.59054 | -0.05187583 |
| 66 | -1.296895747 | -1.8998271 | -3.41517389 | -3.60112 | 42.96029 | 42.51455 | -0.068946341 |
| 67 | -1.723658536 | -2.8070236 | -1.296895747 | -1.899827 | 42.89134 | 42.40227 | -0.168550672 |
| 68 | -4.213766805 | -3.1023054 | -1.723658536 | -2.807024 | 42.72279 | 42.27817 | -0.155659793 |
| 69 | -3.891494816 | -4.0616172 | -4.213766805 | -3.102305 | 42.56713 | 42.11571 | -0.167943321 |
| 70 | -4.198583024 | -1.3325331 | -3.891494816 | -4.061617 | 42.39919 | 42.06241 | -0.065037495 |
| 71 | -1.625937371 | -2.9110777 | -4.198583024 | -1.332533 | 42.33415 | 41.94596 | -0.110201807 |

FIG. 6-5

|    | 14 | 15 | 16 | 17 | 18 | 19 | 20 |
|---|---|---|---|---|---|---|---|
|    |    | Max n | Max n-1 | Max n > Thresh? | Max n > Max n-1 ? | Max n < Max n-1? | Increasing |
|    |    | 2 |    |    |    |    |    |
| 47 | -0.139818 | -2.397625061 | -1.529702 | 0 | 0 | 1 | 1 |
| 48 | 0.102722 | -0.877510626 | -2.397625 | 0 | 1 | 0 | 1 |
| 49 | 0.283594 | 5.31487012 | -0.877511 | 1 | 1 | 0 | 1 |
| 50 | 0.354338 | 9.960794207 | 5.3148701 | 1 | 1 | 0 | 1 |
| 51 | 0.618298 | 13.80857038 | 9.9607942 | 1 | 1 | 0 | 1 |
| 52 | 0.457343 | 18.46104153 | 13.80857 | 1 | 1 | 0 | 1 |
| 53 | 0.185274 | 12.92411725 | 18.461042 | 1 | 0 | 1 | 1 |
| 54 | -0.005153 | 8.337038818 | 12.924117 | 1 | 0 | 1 | 0 |
| 55 | 0.036371 | 0.773722982 | 8.3370388 | 1 | 0 | 1 | 0 |
| 56 | 0.114273 | 2.379274294 | 0.773723 | 1 | 1 | 0 | 0 |
| 57 | -0.112866 | 2.955081258 | 2.3792743 | 1 | 1 | 0 | 1 |
| 58 | -0.14806 | -2.75753015 | 2.9550813 | 0 | 0 | 1 | 1 |
| 59 | -0.204549 | -2.603203399 | -2.75753 | 0 | 1 | 0 | 1 |
| 60 | -0.138264 | -5.113736569 | -2.603203 | 0 | 0 | 1 | 1 |
| 61 | -0.066005 | -3.456591168 | -5.113737 | 0 | 1 | 0 | 1 |
| 62 | -0.121617 | -1.650132996 | -3.456591 | 0 | 1 | 0 | 1 |
| 63 | -0.06302 | -2.967369083 | -1.650133 | 0 | 0 | 1 | 1 |
| 64 | -0.144045 | -1.575494159 | -2.967369 | 0 | 1 | 0 | 1 |
| 65 | -0.075993 | -3.41517389 | -1.575494 | 0 | 0 | 1 | 1 |
| 66 | -0.112281 | -1.296895747 | -3.415174 | 0 | 1 | 0 | 1 |
| 67 | -0.124092 | -1.723658536 | -1.296896 | 0 | 0 | 1 | 1 |
| 68 | -0.162465 | -3.1023054 | -1.723659 | 0 | 0 | 1 | 1 |
| 69 | -0.053301 | -3.891494816 | -3.102305 | 0 | 0 | 1 | 1 |
| 70 | -0.116443 | -1.332533118 | -3.891495 | 0 | 1 | 0 | 1 |
| 71 | -0.058485 | -1.625937371 | -1.332533 | 0 | 0 | 1 | 1 |

FIG. 6-6

METHODS AND APPARATUSES FOR PEAK DETECTION AMONG MULTIPLE SIGNALS

This application claims priority to U.S. Provisional Patent Application Ser. No. 60/344,933, filed Dec. 31, 2001. This provisional application is incorporated by reference.

REFERENCE TO APPENDIX

This application includes a computer program listing appendix, submitted on compact disc (CD). The content of the CD is incorporated by reference in its entirety and accordingly forms a part of this specification. The CD contains the following files:

File name: full7function.txt File Size: 25.3 kb

File name: eachchannel.txt File Size: 5.53 kb

Creation date for CD: Dec. 31, 2002

BACKGROUND OF THE INVENTION

The portion of this disclosure contained on CD of this patent document contains material that is subject to copyright protection. The copyright owner has no objection to the facsimile reproduction by anyone of the patent document or the patent disclosure on the CD, as it appears in the Patent and Trademark Office patent files or records, but otherwise reserves all copyright rights whatsoever.

1. Field of the Invention

The invention relates generally to the field of electronic detection. More particularly, the invention relates to peak detection. Even more particularly, the inventions relates to methods and apparatuses that provide digital peak detection among multiple signals.

2. Discussion of the Related Art

In electronic detection applications, it may be necessary to find and record pulse peaks from continuous streams of analog signals. The streams of analog signals may be, for example, amplified laser detector outputs, or the like. In analog detectors, a front-end amplifier circuitry has been used to deliver high level analog signals to the balance of a detection circuit. A commonly employed analog peak finding technique includes utilizing a biased diode matrix to find the largest input signal among the various input channels. A digital follow-on circuit for pulse amplitude recording and transmission has also been used.

A problem with this technology has been the small instantaneous dynamic range of the analog detection circuit, typically of the order of 20 to 1, which prevents it from being able to track widely varying signals. Therefore, what is required is solution that provides a wide instantaneous dynamic range.

Another problem with this technology has been that the very high speed emitter coupled logic (ECL) parts needed for the peak detection and capture functions dissipate a substantial amount of power. Therefore, what is also needed is a solution that can operate with low power dissipation.

The following U.S. patents are representative of aspects of the state of technology relating to electronic detection.

U.S. Pat. No. 6,424,900, which is incorporated by reference, involves a partial discharge measurement system is provided which comprises a digital peak detection circuit. The partial discharge measurement system digitizes and detects both positive and negative slopes of a signal from an electrical device being tested. The partial discharge measurement system controls the shape of pulse capture windows in accordance with different modes of operation, and controls the timing of pulse data capture depending on the mode of operation and the polarity of the signal.

U.S. Pat. No. 6,215,335, which is incorporated by reference, involves a peak detector that compares an input signal to a first reference voltage to produce a maximum sample signal, and compares the input signal to a second reference voltage to produce a minimum sample signal, wherein the maximum and minimum sample signals produce a sampling of the current input signal thereto to produce a maximum output signal and a minimum output signal, respectively. The detector compares the previously retrieved input signal value with a current input signal value. The current input signal is used as the maximum output signal if it is greater than a previous maximum output signal and providing the current input signal as the minimum output signal if it is less than a previous minimum output signal. The output provides signal level and offset signal information which, when gated with a predetermined clock signal, produces nonoverlapping phased output signals.

U.S. Pat. No. 5,920,438, which is incorporated by reference, involves a programmable digital device and method for generating tracking threshold signals for qualification of input peak signals in response to programmed digital gain signals which control the rate at which the envelope of the qualified input peak signals is followed, and in response to a programmed digital attenuation signal which determines the proportion of the peak envelope at which to generate new tracking threshold signals. The programmable digital device and method also provide a programmed clamp signal to clamp the positive and negative threshold signals to not fall below the programmed values. An anti-hang capability is provided to allow the thresholds to drop after a programmed time period during which no signal is detected. In an alternative arrangement, the centerline of the envelope is followed and used as the threshold.

U.S. Pat. No. 5,631,592, which is incorporated by reference, involves a pulse generation and sensing arrangement in a microprocessor system (100—this and the other numbers in this paragraph are taken from U.S. Pat. No. 5,631,592) includes an input/output terminal (130) which receives an input signal or produces an output signal, an edge detector (132) which senses pulse edges in the input signal, timers (108, 110) which produce time values, registers (120, 124, 126) which hold time values produced by the timers corresponding to edges detected by the edge detector or which hold values corresponding to pulse edges to be generated, comparators which compare the values held in the registers with time values produced by the timers, and a flip-flop (128) for generating a signal whose state changes in response to the comparators. The arrangement allows the generation and/or sensing of signals with short pulse widths and a wide range of duty cycles, and minimizes software overhead. A continuous PWM signal may be generated without further software involvement after initial writing of edge values.

The shortcomings described above are not intended to be exhaustive, but rather among the many that tend to impair the effectiveness of previously known techniques of detecting the peak pulse from multiple inputs. Other noteworthy problems may also exist; however, those mentioned here are sufficient to demonstrate that methodologies appearing in the art have not been altogether satisfactory.

SUMMARY OF THE INVENTION

The shortcomings listed above are reduced or eliminated by the present techniques. These techniques are applicable to a vast number of applications, including but not limited to applications involving laser detection.

In one respect, the invention is a detection method. The method includes receiving multiple digitized input signals. For each digitized input signal, the method also includes noting a first data value associated with the digitized input signal at a first time. The method includes comparing the first data values to determine a largest first data value from among the first data values. For each digitized input signal, the method includes noting a second data value associated with the digitized input signal at a second time. The method includes comparing the second data values to determine a largest second data value from among the second data values. The method includes comparing the largest second data value with a threshold data value. The method includes detecting a peak when the largest second data value is greater than the threshold data value, and less than the largest first data value.

The method may also include extracting the second data values once the peak is detected, and storing them in a memory device, which may, for example, be a first-in-first-out memory device, or the like. The comparing of the first data values may take place over multiple clock periods. Similarly, the comparing of the second data values may take place over multiple clock periods.

The method may also include first digitizing multiple analog input signals to get the multiple digitized input signals that are then received, and filtering the multiple digitized input signals.

In another respect, the invention is a computer readable medium comprising machine readable instructions for implementing the detection method described above.

In still other respects, the invention is a device that includes either a field programmable gate array (FPGA) or an application specific integrated circuit (ASIC) that is configured to perform at least the steps of the detection method described above. That is, the FPGA or the ASIC can be provided with logic, or programming, that can be utilized in performing the steps of the detection method described above.

These and other embodiments of the invention, along with associated advantages, will be better appreciated and understood when considered in conjunction with the following description and the accompanying drawings.

BRIEF DESCRIPTION OF THE DRAWINGS

The following drawings demonstrate certain aspects of the present methods and devices. They illustrate by way of example and not limitation.

FIG. 6 is a spreadsheet showing a breadboard simulation according to one embodiment of the present invention in which 2 signals are compared.

DESCRIPTION OF ILLUSTRATED EMBODIMENTS

Figure 1:
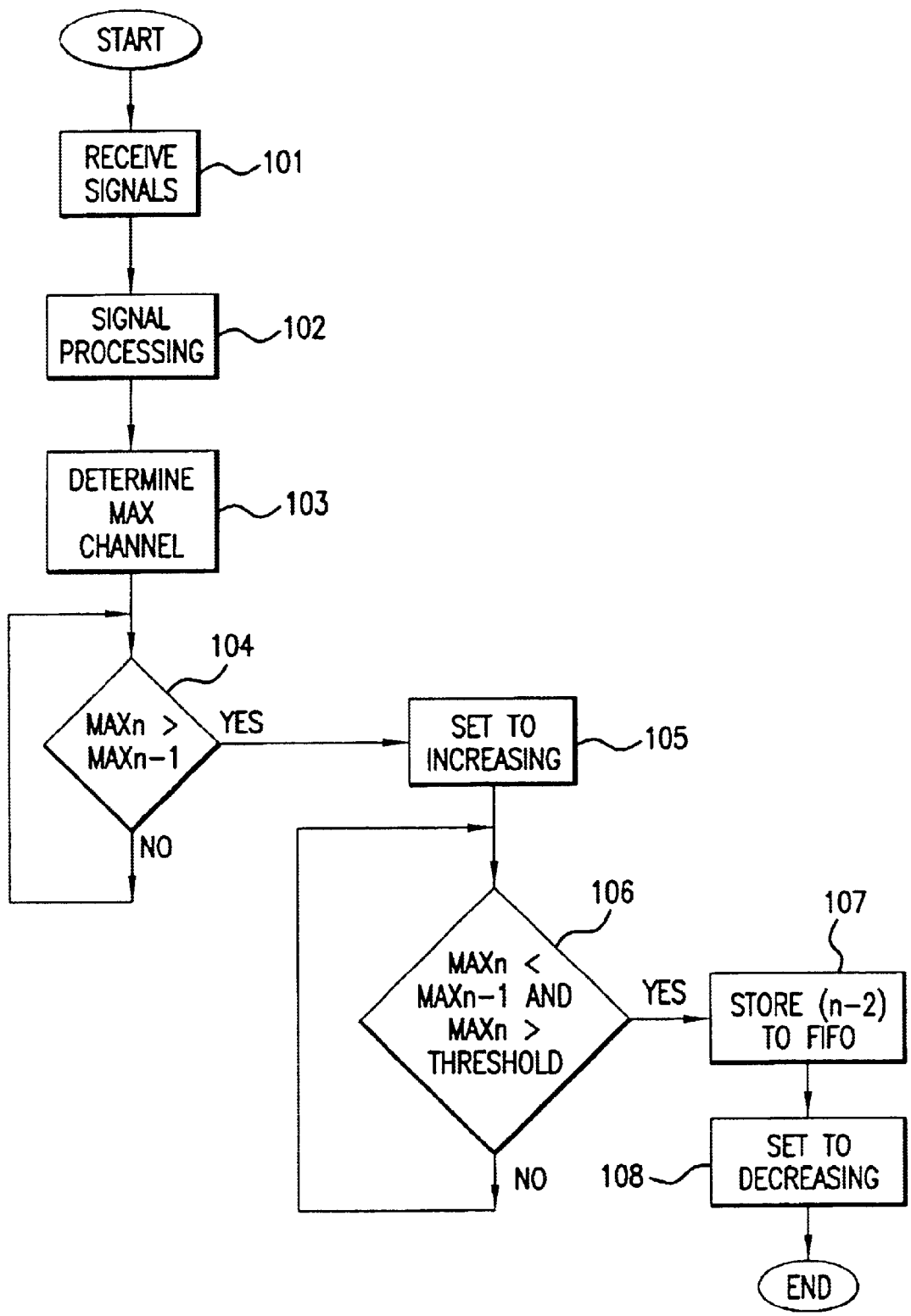
FIG. 1 is a flowchart of a processing method for an FPGA that can be part of an apparatus, such as a device that includes an FPGA, or a method according to one embodiment of the present invention.

In this document (including the claims), the terms "comprise" (and any form of comprise, such as "comprises" and "comprising"), "have" (and any form of have, such as "has" and "having"), and "include" (and any form of include, such as "includes" and "including") are open-ended linking verbs. Thus, a detection method "comprising" (a) receiving multiple digitized input signals; (b) for each digitized input signal, noting a first data value associated with the digitized input signal at a first time; (c) comparing the first data values to determine a largest first data value from among the first data values; (d) for each digitized input signal, noting a second data value associated with the digitized input signal at a second time; (e) comparing the second data values to determine a largest second data value from among the second data values; (f) comparing the largest second data value with a threshold data value; and (g) detecting a peak when the largest second data value is: (i) greater than the threshold data value, and (ii) less than the largest first data value, is a detection method that possesses these steps, but is not limited to possessing only these steps. For example, such a detection method also covers a method that includes (h) extracting the second data values; and (i) storing the second data values in a memory device.

Similarly, a device "comprising" an application specific integrated circuit (ASIC) configured to perform steps (a)–(g) referenced above is a device that possesses such an ASIC, but is not limited to possessing only such an ASIC nor is the referenced ASIC limited to one that performs only those steps.

The terms "a" and "an" are defined as one or more than one. The term "another" is defined as at least a second or more. The term "coupled" is defined as connected, although not necessarily directly, and not necessarily mechanically.

The invention and its various features and advantageous details are explained more fully with reference to the non-limiting embodiments that are illustrated in the accompanying drawings and detailed in the following description. Descriptions of well known starting materials, processing techniques, components and equipment are omitted so as not to unnecessarily obscure the invention in unnecessary detail. It should be understood, however, that the detailed description and the specific examples, while indicating exemplary embodiments of the invention, are given by way of illustration only and not by way of limitation. Various substitutions, modifications, additions and/or rearrangements within the scope of the invention will become apparent to those skilled in the art from this disclosure.

The invention provides methods and apparatuses for finding, recording, and transmitting pulse peaks from a continuous stream of digitized analog signals in real-time. The input analog signals may include, for example, amplified laser detector outputs. As a result of the present methods and apparatuses, a high instantaneous dynamic range is achieved, and significant reductions in cost, space and heat dissipation are afforded over previously known techniques.

In one embodiment, the methods and apparatuses of the invention can provide an effective data bandwidth on the order of 20 nanoseconds, i.e., consecutive pulses separated by 20 nanosecond intervals can be detected and stored using the present methods and apparatuses. However, smaller intervals may be achieved with a higher sampling rate in the analog to digital conversion.

In another embodiment, the methods and apparatuses of the invention can provide an instantaneous dynamic range on the order of 100 to 1, i.e., very large instantaneous signal magnitude variations can be detected. However, a higher instantaneous dynamic range may be achieved with higher-resolution analog to digital converters.

The invention can be implemented in a method or apparatus that utilizes the programming in an FPGA, sometimes called a programmable logic device (PLD), or the like. The invention can also be implemented in a method or apparatus that utilizes an ASIC.

In an embodiment of the invention in which a method or apparatus utilizes the programming in an FPGA, two or more channels of digital data, which may be taken from one or more analog to digital converter (ADC) circuits, are fed into the input pins of the FPGA. The channels of digital data, also referred to herein as multiple digitized input signals, may be 2 or greater in number, including 2, 3, 4, 5, 6, 7, 8, 9, 10, 11, 12, 13, 14, 15, 16, 17, 18, 19, or more. The data that is fed into the input pins of the FPGA is latched into registers internal to the FPGA, with a new data word input on each channel appearing at each new rising edge of the clock.

Referring to aspects of the same embodiment, each data from each digitized input signal is first passed through a high-pass filter, i.e., filtered, in order to eliminate the small but random offsets that may be generated in each ADC circuit. This may be done digitally by first calculating the first order low pass filter to get an averaged value, then subtracting the averaged value from the input value to get the high-passed value.

Still referring to aspects of the same embodiment, next, each data value of each channel is compared to the data value from an adjacent channel, in pair-wise fashion. The largest of each pair is passed to another comparison, and so on, until the largest data value among the channels is found. In instances in which more than one layer, or set, of comparisons in needed (e.g., in instances where at least 3 or more digitized input signals are being compared), multiple clock periods are needed since only one set of comparisons can be performed during each clock period. As a result, both the data channel values and the comparisons are pipelined.

Continuing with aspects of the same embodiment, the largest data value among the channels for one clock period (i.e., a largest second data value) is compared with the largest data value among the channels for a previous clock period (a largest first data value). A state machine is used to compare the largest second data value to a threshold data value, which is set from another state machine. If the largest second data value is both greater than the threshold data value and less than the largest first data value, a peak has been detected. It is not important to detect the data value of the actual peak. It is sufficient for the purposes of this embodiment of the invention to detect a data value that is close to the data value of the actual peak. In short, this embodiment seeks a data value that is on or just after the peak.

In addition, for a peak to be found, the FPGA should be in a "find peak" state. When a peak is detected, the data values for each channel are extracted from the correct position in the pipeline of each channel and stored in a memory device, such as a first-in-first-out (FIFO) memory device, for later transmission to an external processor. The logic, or programming, then changes to a "wait to find peak" state. The logic switches back to the "find peak" state when either the second, or current, largest data value is less greater than the first, or previous, largest data value, or the current largest data value is less than the threshold. Which of these two possibilities is used may be programmable and determined by user preferences, since they may be dependent on the nature of the signal, the overall processing problem, and/or the application.

FIG. 1 is a flowchart of a processing method for an FPGA that can be part of an apparatus, such as a device that includes an FPGA, or a method according to one embodiment of the present invention. In step 101, a set of signals is received. In step 102, each of the set of signals may be processed, high-passed or truncated. In step 103, the channel corresponding to the signal of highest level is determined. This determination may be done by comparing pairs of signals as detailed, for example, in FIG. 5. At this point, the logic (e.g. a state machine) in the FPGA is in a decrease state, and a flag holds a decreasing value. Step 104 is looped until the maximum channel value at (n) is greater than the maximum channel value at (n−1). When MAXn>MAX n−1, the flag is set to an increase value in step 105 (the logic assumes an increase state) and control is passed to step 106. If the maximum channel value at (n−1) is greater than the maximum channel value at (n) and the maximum channel value at (n) is greater than a threshold value, the channel value at (n−2) is stored in a memory device such as, for example, a FIFO memory in step 107. In step 108, the flag is re-set to a decreasing value and the logic assumes a decrease state. Steps 101–108 are repeatable and may be performed continuously.

Figures 1, 2:
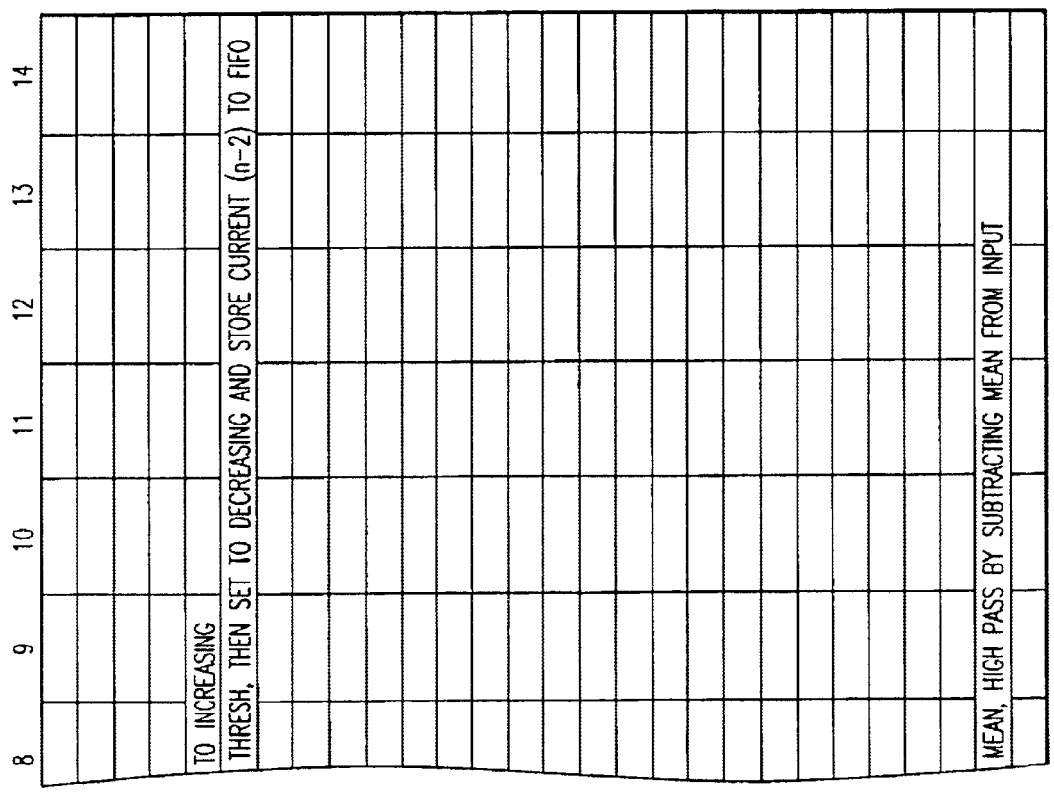
FIG. 2 is a spreadsheet showing a processing layout for an FPGA that can be part of an apparatus, such as a device that includes an FPGA, or a method according to one embodiment of the present invention.

FIG. 2 is a spreadsheet showing a processing layout for an FPGA that can be a part of an apparatus, such as a device that includes the FPGA, or a method according to one embodiment of the present invention.

The following examples are included to demonstrate specific embodiments of the present methods and apparatuses. It should be appreciated by those of skill in the art that the techniques disclosed in the examples that follow represent techniques discovered by the inventor to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the scope of the invention.

EXAMPLE 1

Figures 1, 3:
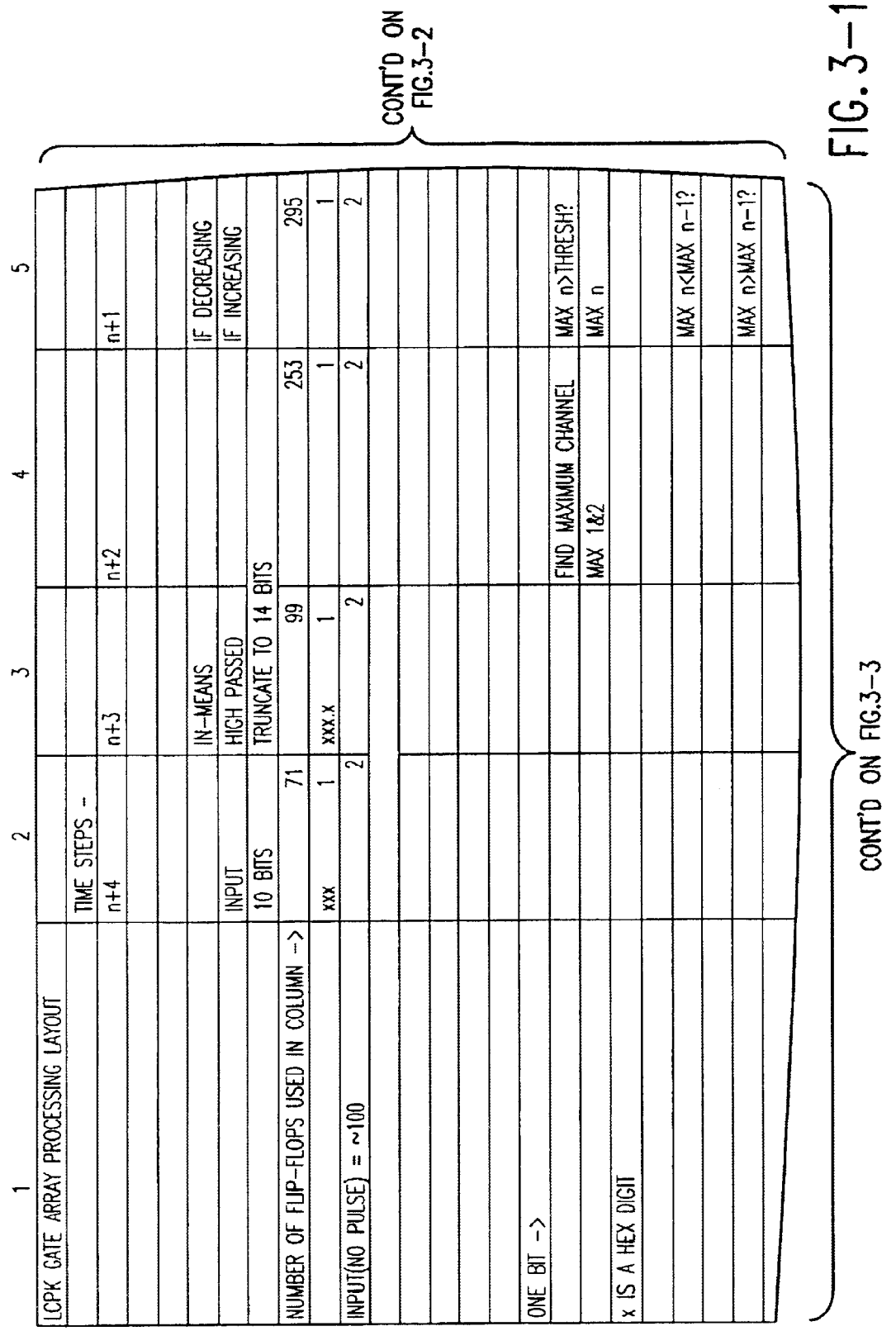
FIG. 3 is a spreadsheet showing a processing layout for an FPGA that can be part of an apparatus, such as a device that includes an FPGA, or a method according to one embodiment of the present invention in which 2 input signals are compared.

FIG. 3 is a spreadsheet showing a processing layout for an FPGA that can be a part of an apparatus, such as a device that includes the FPGA, or a method according to one embodiment of the present invention in which 2 input signals are compared. In this embodiment, as in all embodiments, a separate source can generate each input signal.

EXAMPLE 2

Figures 3, 4:
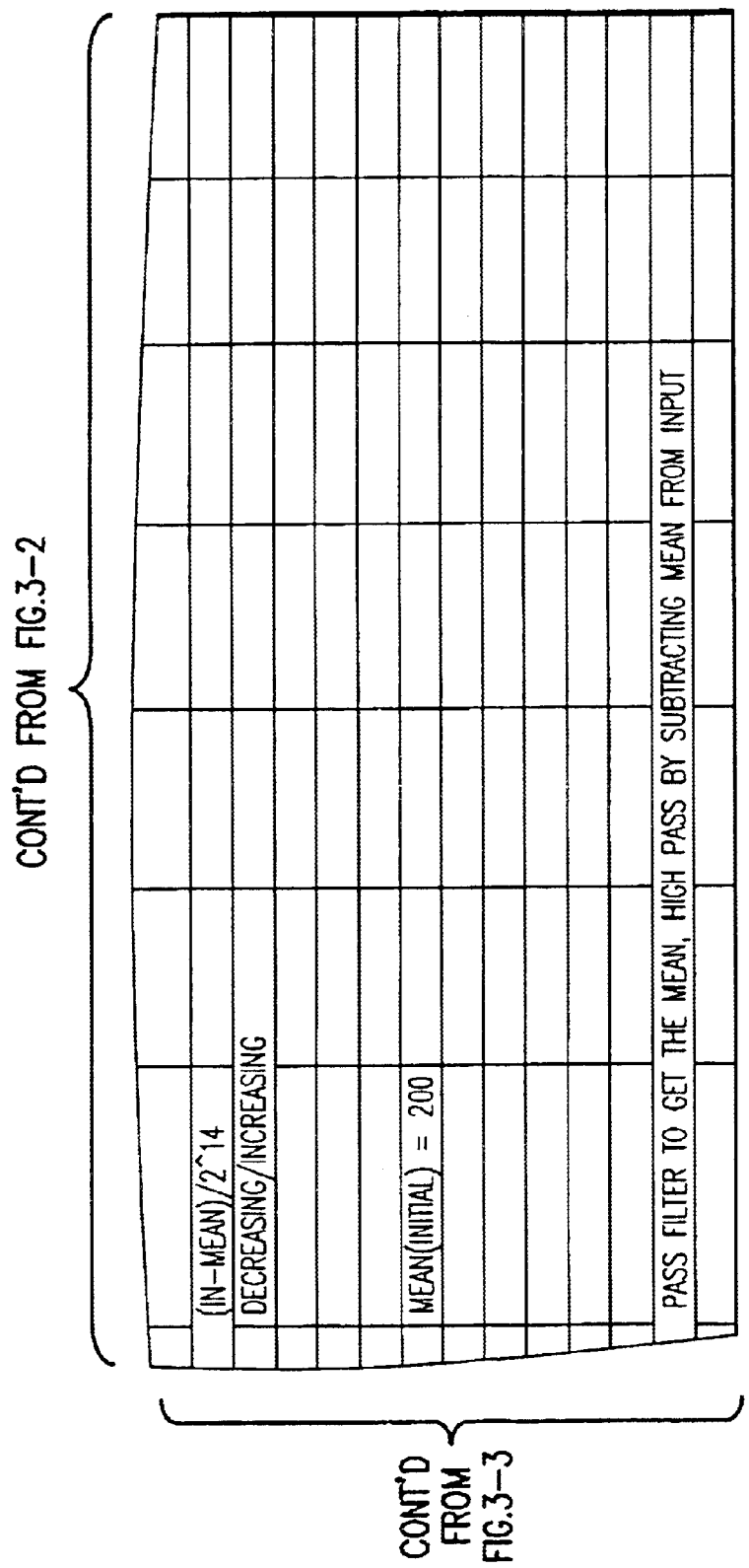
FIG. 4 is a spreadsheet showing a processing layout for an FPGA that can be part of an apparatus, such as a device that includes an FPGA, or a method according to one embodiment of the present invention in which 7 input signals are compared.
Figure 3:
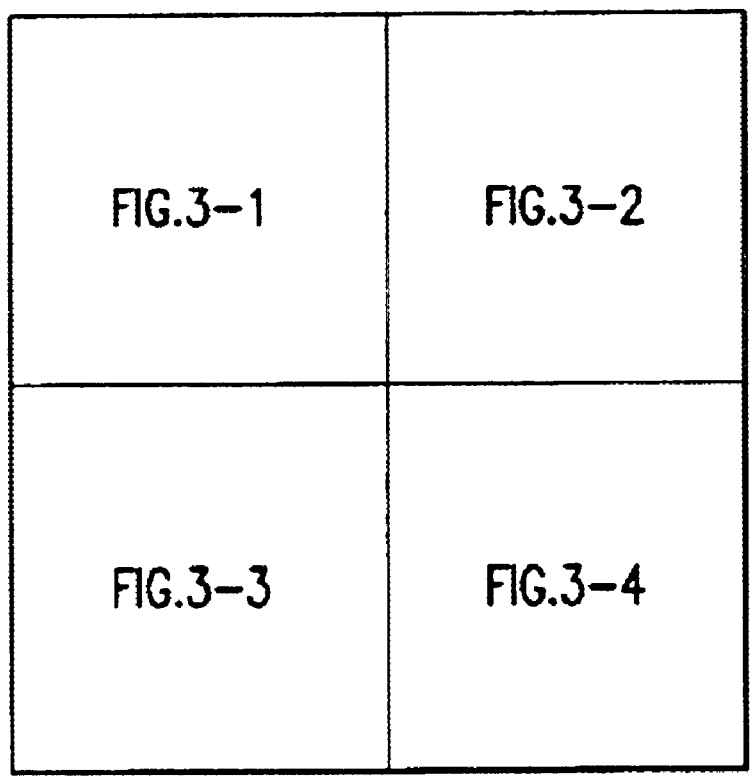

FIG. 4 is a spreadsheet showing a processing layout for an FPGA that can be a part of an apparatus, such as a device that includes the FPGA, or a method according to one embodiment of the present invention in which 7 input signals are compared. In this embodiment, as in all embodiments, a separate source can generate each input signal. In this embodiment, pipelining of both the data values and the comparisons is illustrated in columns 4–8. Columns 4–6 have comparisons to find the largest data value among the two channels, and columns 7 and 8 have the comparisons to find if a peak has occurred and if that data value corresponding to the peak detection is greater than a threshold data value. The data values are passed from column to column. Those data values are not changed; instead, they are simply passed to the right awaiting the decision to store them or not in a memory buffer, which occurs out of column 8.

EXAMPLE 3

Figure 5:
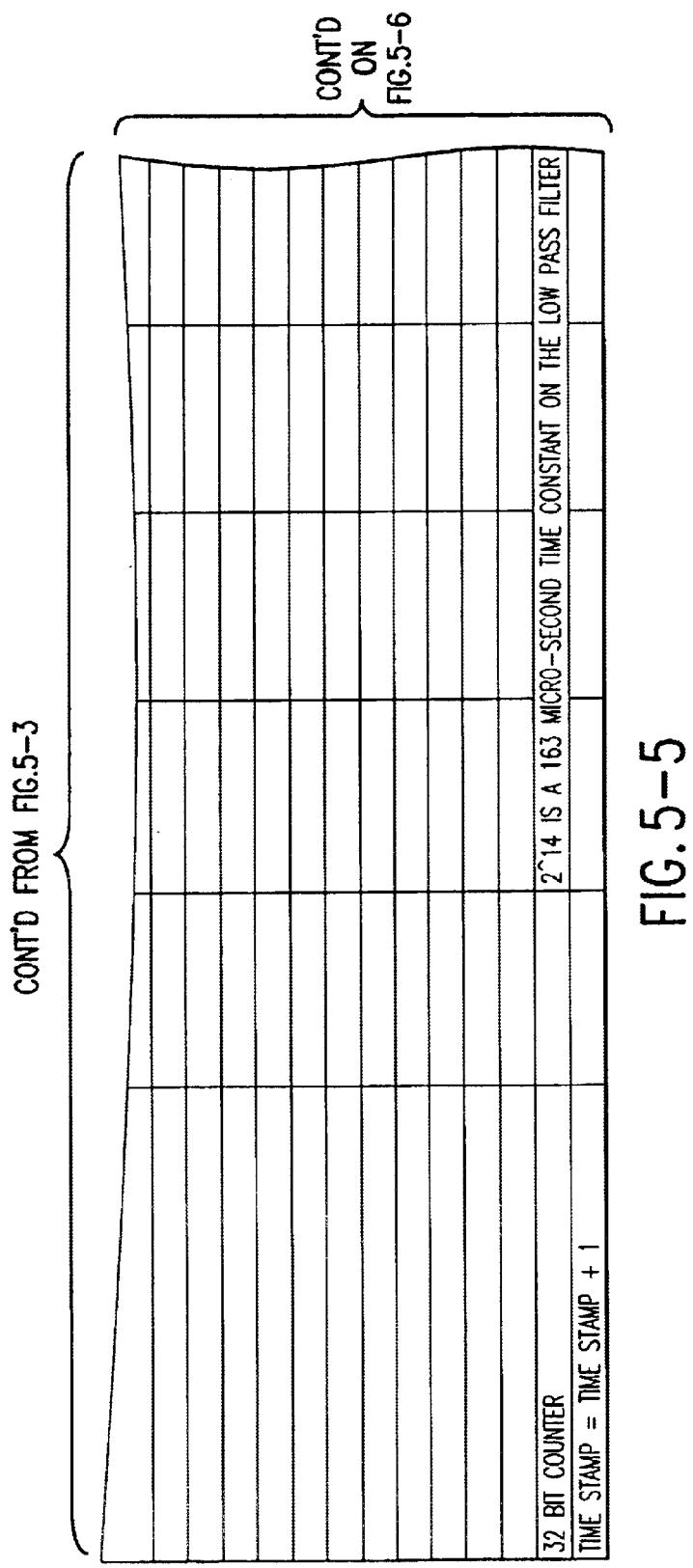
FIG. 5 is a spreadsheet showing a processing layout for an FPGA that can be part of an apparatus, such as a device that includes an FPGA, or a method according to one embodiment of the present invention in which 19 input signals are compared.
Figure 5:
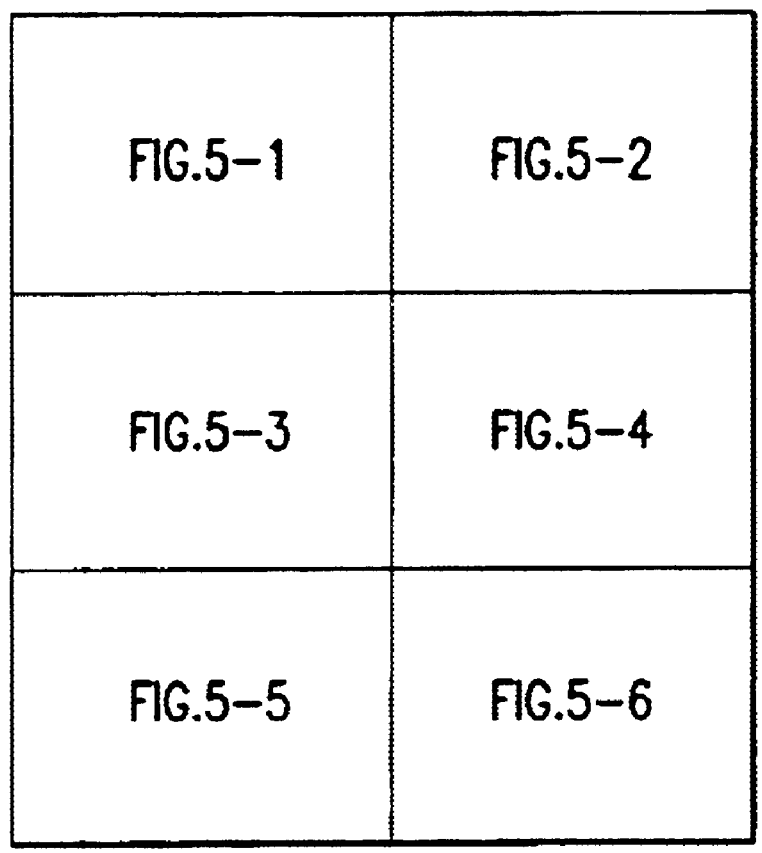

FIG. 5 is a spreadsheet showing a processing layout for an FPGA that can be a part of an apparatus, such as a device that includes the FPGA, or a method according to one embodiment of the present invention in which 19 input signals are compared. In this embodiment, as in all embodiments, a separate source can generate each input signal. In this embodiment, pipelining of both the data values and the comparisons is illustrated in columns 4–10. Columns 4–8 have comparisons to find the largest data value among the two channels, and columns 8 and 9 have the comparisons to find if a peak has occurred and if that data value corresponding to the peak detection is greater than a threshold data value. The data values are passed from column to column. Those data values are not changed; instead, they are simply passed to the right awaiting the decision to store them or not in a memory buffer, which occurs out of column 10.

EXAMPLE 4

FIG. 6 is a table showing a breadboard simulation according to one embodiment of the present invention in which 2 input signals are compared.

Figure 7:
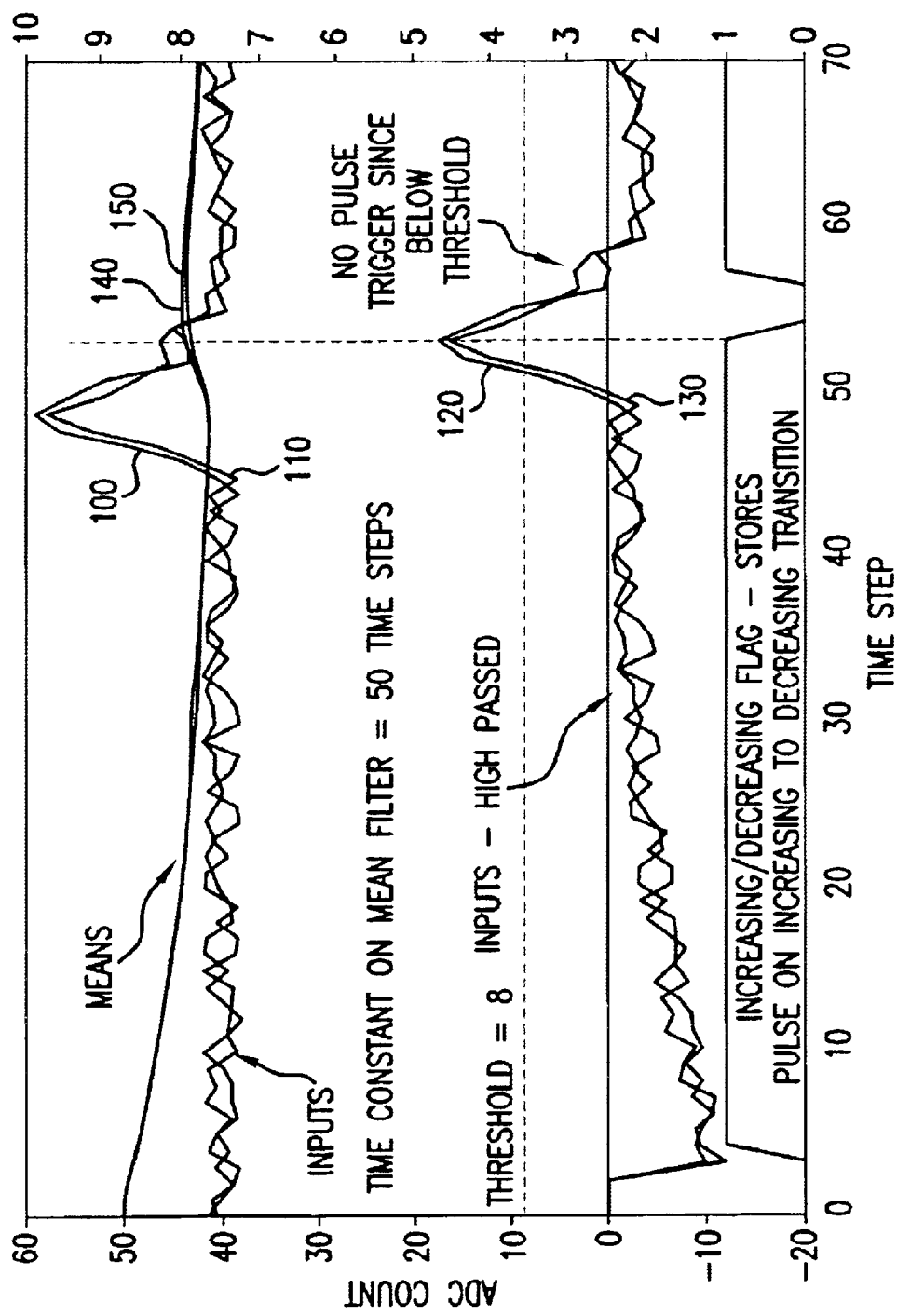
FIG. 7 is a chart graphically depicting data from FIG. 6.

FIG. 7 is a chart graphically depicting data from FIG. 6. The time step, or x-values, for lines 100, 110, 120, 130, 140, and 150 in FIG. 6 are in column 1 of FIG. 6. The ADC count, or y-values, for lines 100, 110, 120, 130, 140, and 150 in FIG. 7 are in columns 2, 3, 10, 11, 12, and 13, respectively, of FIG. 6.

EXAMPLE 5

Shown in the computer program listing appendix (see CD) is source code, written in Very High Speed Integrated Circuit Hardware Description Language (VHDL), that is suitable for carrying out one embodiment of the invention. This source code is exemplary only and does not limit the scope of the claims. It simply represents one specific embodiment for carrying out aspects of the present methods and apparatuses and is included for the convenience of the reader in this regard. Those of ordinary skill in the art having the benefit of this disclosure will recognize that a wide variety of computational techniques and/or different types of corresponding source code may be used in implementing the present methods.

The invention can be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

All the disclosed embodiments of the invention can be made and used without undue experimentation in light of this disclosure. The individual components described above need not be made in the exact disclosed forms, or combined in the exact disclosed configurations, but could be provided in any suitable form, and/or combined in any suitable configuration. Further, although the present methods can be practiced using separate modules, such modules may be integrated into systems with which they are associated.

It will also be clear to those of ordinary skill in the art that substitutions, modifications, additions and/or rearrangements of the features of the inventive methods and devices may be made without deviating from their scope, which is defined by the claims and their equivalents. The appended claims are not to be interpreted as including means-plus-function limitations, unless such a limitation is explicitly recited in a given claim using the phrase(s) "means for" and/or "step for," respectively.

REFERENCES

The disclosures of the following publications in their entireties are expressly incorporated by reference for the purpose of indicating aspects of the state of the art.

Van Nostrand's Scientific Encyclopedia, 8th ed., Van Nostrand Reinhold, (Douglas M. Considine et al. eds.), 1995.

Marks Mechanical Engineering Handbook, 10th ed., McGraw Hill, (Eugene A. Avallone et al. eds.), 1996.

The Electrical Engineering Handbook, CRC Press, (Richard C. Dorf et al. eds.), 1993.

I claim:

1. A detection method comprising:
   (a) receiving multiple digitized input signals;
   (b) for each digitized input signal, noting a first data value associated with the digitized input signal at a first time;
   (c) comparing the first data values to determine a largest first data value from among the first data values;
   (d) for each digitized input signal, noting a second data value associated with the digitized input signal at a second time;
   (e) comparing the second data values to determine a largest second data value from among the second data values;
   (f) comparing the largest second data value with a threshold data value; and
   (g) detecting a peak when the largest second data value is:
      (i) greater than the threshold data value, and
      (ii) less than the largest first data value.

2. The detection method of claim 1, further comprising:
   (h) extracting the second data values; and
   (i) storing the second data values in a memory device.

3. The detection method of claim 2, where the memory device is a first-in-first-out (FIFO) memory device.

4. The detection method of claim 1, where the comparing of step (c) occurs over multiple periods of a clock.

5. The detection method of claim 1, where the comparing of step (f) occurs over multiple periods of a clock.

6. The detection method of claim 1, further comprising:
   (h) digitizing multiple analog input signals to get multiple digitized input signals; and
   (i) filtering the multiple digitized input signals;
   where the receiving of step (a) comprises receiving the multiple digitized input signals.

7. A computer readable medium comprising machine readable instructions for implementing the detection method of claim 1.

8. A device comprising:
   (a) a field programmable gate array (FPGA) configured to at least:

(i) receive multiple digitized input signals;
(ii) for each digitized input signal, note a first data value associated with the digitized input signal at a first time;
(iii) compare the first data values to determine a largest first data value from among the first data values;
(iv) for each digitized input signal, note a second data value associated with the digitized input signal at a second time;
(v) compare the second data values to determine a largest second data value from among the second data values;
(vi) compare the largest second data value with a threshold data value; and
(vii) detect a peak when the largest second data value is:
  (1) greater than the threshold data value, and
  (2) less than the largest first data value.

9. The device of claim 8, where the FPGA is further configured to:
(viii) extract the second data values; and
(ix) store the second data values in a memory device.

10. The device of claim 9, where the memory device is a first-in-first-out (FIFO) memory device.

11. The device of claim 8, where the compare of (iii) occurs over multiple periods of a clock.

12. The device of claim 8, where the compare of (vi) occurs over multiple periods of a clock.

13. The device of claim 8, where the FPGA is further configured to:
(viii) digitize multiple analog input signals to get multiple digitized input signals; and
(ix) filter the multiple digitized input signals;
where the receive of (i) comprises receive the multiple digitized input signals.

14. A device comprising:
(a) an application specific integrated circuit (ASIC) configured to:
  (i) receive multiple digitized input signals;
  (ii) for each digitized input signal, note a first data value associated with the digitized input signal at a first time;
  (iii) compare the first data values to determine a largest first data value from among the first data values;
  (iv) for each digitized input signal, note a second data value associated with the digitized input signal at a second time;
  (v) compare the second data values to determine a largest second data value from among the second data values;
  (vi) compare the largest second data value with a threshold data value; and
  (vii) detect a peak when the largest second data value is:
    (1) greater than the threshold data value, and
    (2) less than the largest first data value.

15. The device of claim 14, where the ASIC is further configured to:
(viii) extract the second data values; and
(ix) store the second data values in a memory device.

16. The device of claim 15, where the memory device is a first-in-first-out (FIFO) memory device.

17. The device of claim 14, where the compare of (iii) occurs over multiple periods of a clock.

18. The device of claim 14, where the compare of (vi) occurs over multiple periods of a clock.

19. The device of claim 14, where the ASIC is further configured to:
(viii) digitize multiple analog input signals to get multiple digitized input signals; and
(ix) filter the multiple digitized input signals;
where the receive of (i) comprises receive the multiple digitized input signals.

20. A detection method comprising:
(a) receiving multiple digitized input signals, where, for each digitized input signal, a first data value is associated with the digitized input signal at a first time and a second data value is associated with the digitized input signal at a second time;
(b) determining a largest first data value from among the first data values;
(c) determining a largest second data value from among the second data values; and
(d) detecting a peak when the largest second data value is:
  (i) greater than a threshold data value, and
  (ii) less than the largest first data value.

21. The detection method of claim 20, further comprising:
(e) extracting the second data values; and
(f) storing the second data values in a memory device.

22. The detection method of claim 21, where the memory device is a first-in-first-out (FIFO) memory device.

23. The detection method of claim 20, where the determining of step (b) includes multiple comparisons of first data values.

24. The detection method of claim 20, where the determining of step (c) includes multiple comparisons of second data values.

25. The detection method of claim 20, further comprising:
(e) digitizing multiple analog input signals to get multiple digitized input signals; and
(f) filtering the multiple digitized input signals;
where the receiving of step (a) comprises receiving the multiple digitized input signals.

26. A computer readable medium comprising machine readable instructions for implementing the detection method of claim 20.

27. An integrated circuit configured to implement the detection method of claim 20.

28. A field programmable gate array (FPGA) configured to implement the detection method of claim 20.

* * * * *

UNITED STATES PATENT AND TRADEMARK OFFICE
CERTIFICATE OF CORRECTION

PATENT NO.   : 6,870,358 B2
DATED        : March 22, 2005
INVENTOR(S)  : William C. Alexander It is certified that error appears in the above-identified patent and that said Letters Patent is hereby corrected as shown below:

<u>Title page,</u>
Item [73], Assignee, replace "BAES" with -- BAE --.

Signed and Sealed this

Ninth Day of August, 2005

JON W. DUDAS
*Director of the United States Patent and Trademark Office*